(12) United States Patent
Mellinger, III

(10) Patent No.: US 9,977,434 B2
(45) Date of Patent: May 22, 2018

(54) AUTOMATIC TRACKING MODE FOR CONTROLLING AN UNMANNED AERIAL VEHICLE

(71) Applicant: QUALCOMM Incorporated, San Diego, CA (US)

(72) Inventor: Daniel Warren Mellinger, III, Philadelphia, PA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 15/190,507

(22) Filed: Jun. 23, 2016

(65) Prior Publication Data

US 2017/0371353 A1    Dec. 28, 2017

(51) Int. Cl.
| | |
|---|---|
| *H04W 92/18* | (2009.01) |
| *G05D 1/10* | (2006.01) |
| *G08G 5/00* | (2006.01) |
| *H04M 1/725* | (2006.01) |
| *H04W 4/02* | (2018.01) |
| *B64C 39/02* | (2006.01) |
| *G05D 1/04* | (2006.01) |
| *G01S 19/42* | (2010.01) |

(52) U.S. Cl.
CPC .......... *G05D 1/101* (2013.01); *B64C 39/024* (2013.01); *G01S 19/42* (2013.01); *G05D 1/042* (2013.01); *G08G 5/0069* (2013.01); *H04M 1/72572* (2013.01); *H04W 4/023* (2013.01); *B64C 2201/127* (2013.01); *B64C 2201/141* (2013.01)

(58) Field of Classification Search
CPC .. G08G 5/0069; G08G 5/0013; G08G 5/0026; G08G 5/0043; G08G 5/0082; B64C 2201/141; G05D 2201/0207; G01S 5/0236; G01S 5/22; G01C 21/20; H04W 4/02; H04W 4/021; H04W 24/04; H04W 48/04; H04W 88/04
USPC ........ 701/3, 11; 455/11.1, 456.3; 702/94, 95
See application file for complete search history.

(56) References Cited

U.S. PATENT DOCUMENTS

| | | | |
|---|---|---|---|
| 9,367,067 B2* | 6/2016 | Gilmore | ................. G05D 1/101 |
| 2001/0043721 A1* | 11/2001 | Kravets | ..................... G06T 7/20 |
| | | | 382/107 |

(Continued)

*Primary Examiner* — Dalena Tran
(74) *Attorney, Agent, or Firm* — The Marbury Law Group, PLLC

(57) ABSTRACT

Some embodiments include methods performed by a processor associated with a wireless communication device for enabling an unmanned autonomous vehicle (UAV) to operate in an automatic user tracking mode. Such embodiments may include capturing image data of surroundings by a camera while the UAV is operating in the automatic user tracking mode, calculating estimated position information for the wireless communication device based on captured image data, and transmitting estimated position information to the UAV for use in tracking a user of the wireless communication device. Some embodiments include methods performed by a processor of a UAV for enabling the UAV to automatically follow a user. Such embodiments may include calculating a current position of the UAV, receiving from a user's wireless communication device estimated position information derived from image data captured by a camera of the wireless communication device, and determining whether an update to the UAV motion is required.

30 Claims, 9 Drawing Sheets

(56) References Cited

U.S. PATENT DOCUMENTS

| | | | |
|---|---|---|---|
| 2010/0201829 A1* | 8/2010 | Skoskiewicz | G08G 1/04 |
| | | | 348/211.2 |
| 2010/0292868 A1 | 11/2010 | Rotem et al. | |
| 2010/0305778 A1 | 12/2010 | Dorneich et al. | |
| 2012/0287274 A1* | 11/2012 | Bevirt | H04N 7/185 |
| | | | 348/144 |
| 2015/0142211 A1 | 5/2015 | Shehata et al. | |
| 2016/0068264 A1 | 3/2016 | Ganesh et al. | |
| 2016/0083115 A1 | 3/2016 | Hess | |

* cited by examiner

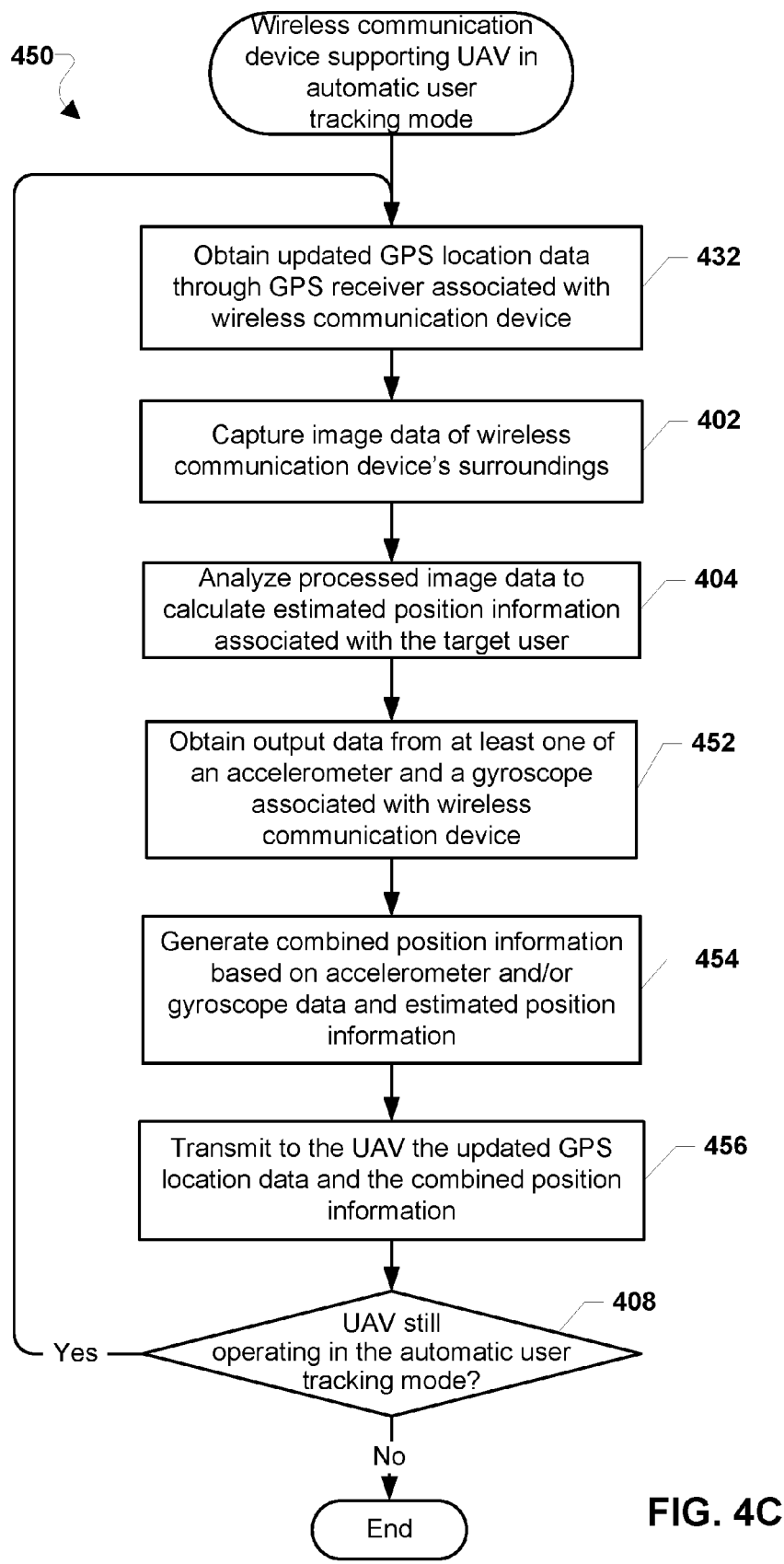

AUTOMATIC TRACKING MODE FOR CONTROLLING AN UNMANNED AERIAL VEHICLE

BACKGROUND

Aerial vehicles such as unmanned aerial vehicles (UAVs) can be used for performing surveillance, reconnaissance, and exploration tasks for military and civilian applications. Such aerial vehicles may carry a payload configured to perform a specific function, such as personal photography and videography.

Conventional UAVs may be manually controlled by an operator via a remote control device, requiring a dedicated operator of the UAV different from the subject of the photography or videography.

In some instances, it may be desirable for UAVs to track a specific target. For small-sized UAVs, such tracking is traditionally achieved via control commands from a user-operated remote control terminal or device. Such manual tracking control may become difficult in certain circumstances, such as when the target is moving quickly or is at least partially blocked from view of the user. Furthermore, the attention necessary for such manual tracking typically requires a dedicated user that controls a camera that onboard the UAV separate from the user that controls the navigation, thereby increasing the cost for UAV photography and other applications.

SUMMARY

Various embodiments include methods performed by a processor associated with a wireless communication device for enabling an unmanned autonomous vehicle (UAV) to operate in an automatic user tracking mode. Various embodiments may include capturing image data of surroundings by at least one camera associated with the wireless communication device while the UAV is operating in the automatic user tracking mode, calculating estimated position information for the wireless communication device based on the captured image data, and transmitting the estimated position information to the UAV for use in tracking the target user.

Some embodiments may further include detecting that the automatic user tracking mode is initiated based on detecting user inputs on the wireless communication device. Some embodiments may further include determining whether the UAV is still operating in the automatic user tracking mode, and repeating collecting image data, calculating estimated position information, and transmitting the estimated position information to the UAV in response to determining that the UAV is still operating in the automatic user tracking mode.

In some embodiments, calculating estimated position information may include calculating a change in position of the wireless communication device, and calculating the change in position may include analyzing a sequence of the captured image data over a period of time to calculate a rate of movement of at least one feature in the surroundings of a target user.

Some embodiments may further include obtaining updated location data received through a Global Positioning System (GPS) receiver associated with the wireless communication device, and transmitting the updated location data to the UAV for use in tracking the target user. Some embodiments may further include obtaining inertial sensor output data from at least one of an accelerometer, a gyroscope, and a magnetometer associated with the wireless communication device, and generating combined position information for the wireless communication device based on the estimated position information and the inertial sensor output data, in which transmitting the estimated position information to the UAV may include transmitting the combined position information.

Some embodiments may further include transmitting initial target information to the UAV, wherein the initial target information provides to the UAV an initial location of the wireless communication device. In such embodiment, the initial target information may provide to the UAV identity data for at least one of the wireless communication device and the target user. In some embodiments, the estimated position information transmitted to the UAV may be configured to enable the UAV to determine whether an update to the UAV motion is required.

Some embodiments may further include receiving user input on the wireless communication device, and transmitting to the UAV one or more flight command derived from the user input, wherein the one or more flight command is transmitted over a wireless communication link with the estimated position information. In some embodiments, calculating estimated position information may include calculating a current estimated position of the wireless communication device.

Further embodiments include a wireless communication device including a transceiver and a processor coupled to the transceiver, and configured to perform operations of the methods summarized above.

Various embodiments include methods performed by a processor of a UAV for enabling the UAV to automatically follow a user including calculating a current position of the UAV, receiving estimated position information from a wireless communication device associated with the user, in which the estimated position information is derived from image data of surroundings of the user captured by at least one camera of the wireless communication device, and determining whether an update to the UAV motion is required. In some embodiments, receiving the estimated position information from the wireless communication device may include receiving a change in position calculated by the wireless communication device. In some embodiments, receiving the estimated position information from the wireless communication device may include receiving a current estimated position of the wireless communication device, and the method may further include calculating a change in position of the wireless communication device using the received current estimated position.

In some embodiments, determining whether an update to the UAV motion may include comparing the estimated position information to previous position information received from the wireless communication device, and detecting movement of the wireless communication device based on the comparison. In some embodiments, determining whether an update to the UAV motion may include comparing the estimated position information to a current UAV position, and determining whether the UAV has maintained a selected offset from the wireless communication device, wherein the selected offset may include a preset elevation or ground distance.

Some embodiments may further include receiving via a wireless communication one or more flight commands from the wireless communication device, determining whether implementing the one or more flight commands would cause the UAV to collide with an obstacle, and using the estimated position information to override or modify the one or more flight commands in response to determining that implementing the one or more flight commands would cause the UAV to collide with an obstacle.

Further embodiments include a UAV including a transceiver and a processor coupled to the transceiver, and configured to perform operations of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIGS. 4A-4C are process flow diagrams illustrating methods for supporting on a wireless communication device an automatic user tracking mode implemented by a UAV according to various embodiments.

DETAILED DESCRIPTION

Figure 1:
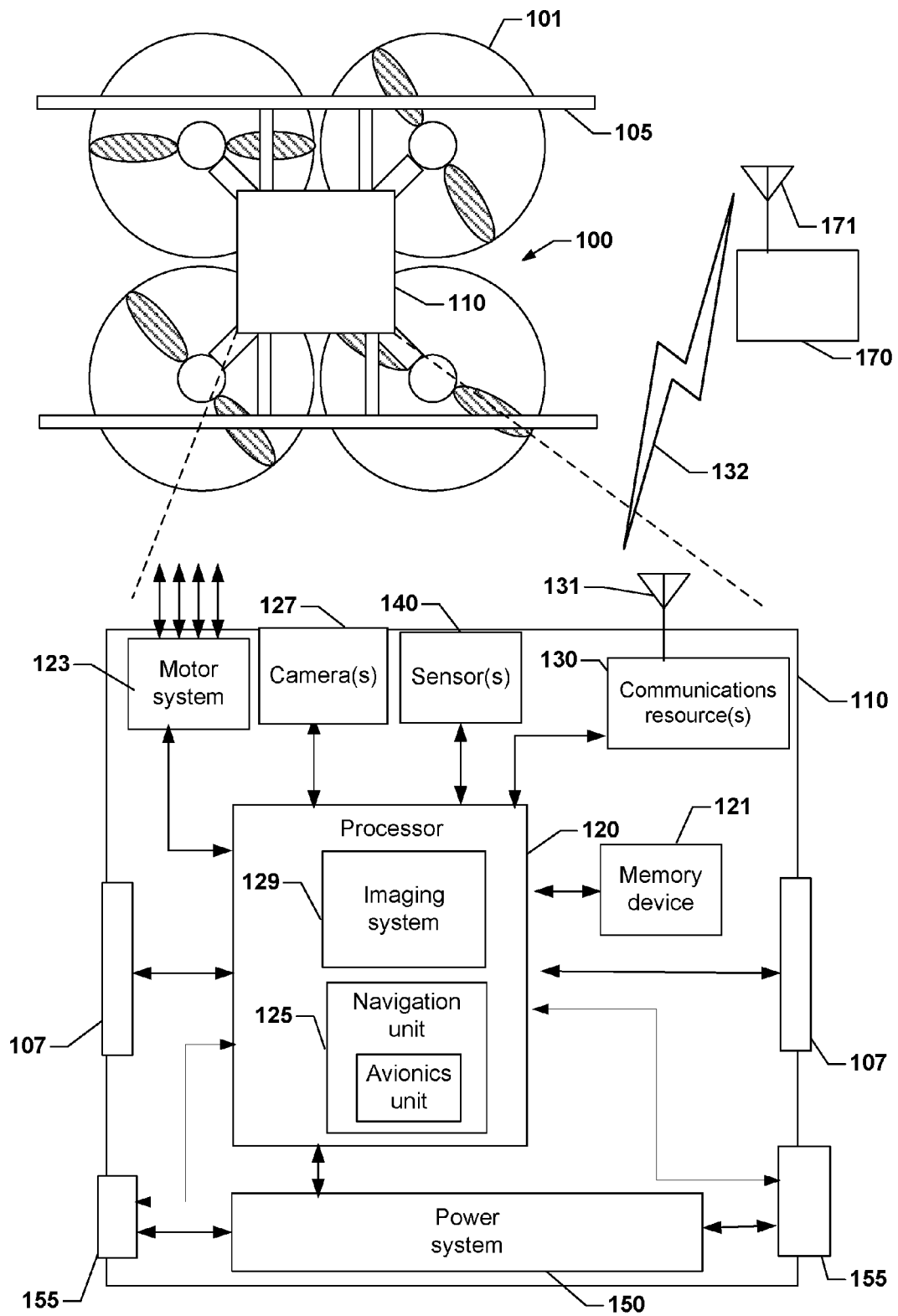
FIG. 1 is a block diagram illustrating components of a typical UAV system suitable for use in the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide an improved automatic tracking mode used to control motion of an unmanned aerial vehicle (UAV) based on a control device associated with a target user. In particular, the control device is configured with at least one camera and various sensors (e.g., accelerometer, gyroscope, magnetometer, etc.), which are used to calculate position information (e.g., an estimated position, change in position information, or combined position information) for the control device. Position information may be based on data from at least one sensor on the control device, which may determine a relative position of the target in the local environment.

The control device may utilize captured image data of the surrounding environment to calculate position information (e.g., change in position information) associated with the target user, such as motion and/or change in direction of the control device over the time between images. In some embodiments, the change in position information may be integrated with output data from one or more inertial sensor (e.g., an accelerometer, gyroscope, etc.) to generate combined position information.

In various embodiments, the control device may, after calculating or generating position information (e.g., an estimated position, change in position information, or combined position information), send the information to the UAV in addition to or instead of the target's GPS location. That is, the control device may send the position information, or the position information with GPS location data, to the flight controller of the UAV, which updates/adjusts the motion of the UAV accordingly. Specifically, the UAV may apply some or all of the received data to flight controls to adjust the UAV's position to maintain a predefined position relative to the user (control device). In particular, the UAV may determine its own estimated position based on data from at least one sensor on the UAV. In some embodiments, the current UAV position may also be determined based on the UAV's relative position in the surrounding environment instead of or in addition to the UAV's GPS location. Based on local estimated position information of the user (which may be frequently provided to the UAV by the control device), and the current estimated position of the UAV, the UAV may determine whether and how to adjust its movement to accurately track the target user.

The use of information derived from the camera and/or sensor of the control device in various embodiments, either alone or in combination with data from the control device's GPS receiver, may allow for a more responsive following of the user compared to using only the control device's GPS data for guiding the UAV.

Various embodiments may be useful with any of a number of vehicles, examples of which include UAVs, unmanned autonomous land vehicles, unmanned autonomous watercraft, and autonomous spacecraft. A UAV may be autonomous (self-navigating), remotely controlled, server controlled, beacon controlled, or may be controlled by a combination of control methods. Various embodiments may be particularly useful for aerial UAVs due to the high mobility, and increasing applications and numbers of UAVs, as well as the presence of restricted airspace throughout the world.

The terms "Global Positioning System" (GPS) and "Global Navigation Satellite System" (GNSS) are used interchangeably herein to refer to any of a variety of satellite-aided navigation systems, such as Global Positioning System (GPS) deployed by the United States, GLObal NAvigation Satellite System (GLONASS) used by the Russian military, and Galileo for civilian use in the European Union, as well as terrestrial communication systems that augment satellite-based navigation signals or provide independent navigation information.

An example UAV 100 illustrated in FIG. 1 is a "quad copter" having four horizontally configured rotary lift propellers 101 and motors fixed to a frame 105. The frame 105 may support a controller 110, landing skids and the propulsion motors, power source (power unit 150) (e.g., battery), payload securing mechanism (payload securing unit 107), and other components.

The UAV 100 may be provided with a control unit 110. The control unit 110 may include a processor 120, communication resource(s) 130, sensor(s) 140, and a power unit 150. The processor 120 may be coupled to a memory unit 121 and a navigation unit 125. The processor 120 may be configured with processor-executable instructions to control flight and other operations the UAV 100, including operations of the various embodiments. In some embodiments, the processor 120 may be coupled to a payload securing unit 107 and landing unit 155. The processor 120 may be powered from a power unit 150, such as a battery. The processor 120 may be configured with processor-executable instructions to control the charging of the power unit 150, such as by executing a charging control algorithm using a charge control circuit. Alternatively or additionally, the power unit 150 may be configured to manage charging. The processor 120 may be coupled to a motor system 123 that is configured to manage the motors that drive the rotors 101. The motor system 123 includes one or more propeller drivers. Each of the propeller drivers includes a motor, a motor shaft, and a propeller.

Through control of the individual motors of the rotors 101, the UAV 100 may be controlled in flight. In the processor 120, a navigation unit 125 may collect data and determine the present position and orientation of the UAV 100, the appropriate course towards a destination, and/or the best way to perform a particular function.

An avionics component 129 of the navigation unit 125 may be configured to provide flight control-related information, such as altitude, attitude, airspeed, heading and similar information that may be used for navigation purposes. The avionics component 129 may also provide data regarding the orientation and accelerations of the UAV 100 that may be used in navigation calculations. In some embodiments, the information generated by the navigation unit 125, including the avionics component 129, depends on the capabilities and types of sensor(s) 140 on the UAV 100.

The control unit 110 may include at least one sensor 140 coupled to the processor 120, which can supply data to the navigation unit 125 and/or the avionics unit 129. For example, sensors 140 may include inertial sensors, such as one or more accelerometers (providing motion sensing readings), one or more gyroscopes (providing rotation sensing readings), one or more magnetometers (providing direction sensing), or any combination thereof. Sensors 140 may also include GPS receivers, barometers, etc. Inertial sensors may provide navigational information, e.g., via dead reckoning, including at least one of the position, orientation, and velocity (e.g., direction and speed of movement) of the UAV 100. A GPS receiver may provide three-dimensional coordinate information of the UAV 100 via communication with one or more GPS satellite. A barometer may provide ambient pressure readings used to approximate elevation level (e.g., absolute elevation level) of the UAV 100.

The control unit 110 may include at least one camera 127 and an imaging system 129. The imaging system 129 may be implemented as part of the processor 120, or may be implemented as a separate processor, such as an ASIC, a FPGA, or other logical circuitry. For example, the imaging system 129 may be implemented as a set of executable instructions stored in the memory device 121 that execute on a processor 120 coupled to the at least one camera 127. Each of the cameras 127 may include sub-components other than image capturing sensors, including auto-focusing circuitry, ISO adjustment circuitry, and shutter speed adjustment circuitry, etc.

The control unit 110 may include communication resource(s) 130, which may be coupled to at least one antenna 131 and include one or more transceiver. The transceiver(s) may include any of modulators, de-modulators, encoders, decoders, encryption modules, decryption modules, amplifiers, and filters. The communication resource(s) 130 may receive control instructions (e.g., navigational mode toggling, trajectory instructions, general settings, etc.) from one or more wireless communication device 170.

In some embodiments, the communication resource(s) 130 may include a GPS receiver, enabling Global Navigation Satellite System (GNSS) signals to be provided to the navigation unit 125. Alternatively or in addition, the communication resource(s) 130 may include one or more radio receiver for receiving navigation beacon or other signals from radio nodes, such as navigation beacons (e.g., very high frequency (VHF) omnidirectional range (VOR) beacons), Wi-Fi access points, cellular network sites, radio station, etc. In some embodiments, the navigation unit 125 of the processor 120 may be configured to receive information from a radio resource (e.g., 130). UAVs may navigate using navigation systems such as GNSS, Global Positioning System (GPS), etc. In some embodiments, the UAV may use an alternate source of positioning signals (i.e., other than GNSS, GPS, etc.). Because UAVs often fly at low altitudes (e.g., below 400 feet), the UAV may scan for local radio signals (e.g., Wi-Fi signals, Bluetooth signals, Cellular signals, etc.) associated with transmitters (e.g., beacons, Wi-Fi access points, Bluetooth beacons, small cells (e.g., picocells, femtocells, etc.), etc.) having known locations such as beacons or other signal sources within restricted or unrestricted areas near the flight path. The UAV 100 may use location information associated with the source of the alternate signals together with additional information (e.g., dead reckoning in combination with last trusted GNSS/GPS location, dead reckoning in combination with a position of the UAV takeoff zone, etc.) for positioning and navigation in some applications. Thus, the UAV 100 may navigate using a combination of navigation techniques, including dead-reckoning, camera-based recognition of the land features below the UAV (e.g., recognizing a road, landmarks, highway signage, etc.), etc. that may be used instead of or in combination with GNSS/GPS location determination and triangulation or trilateration based on known locations of detected wireless access points.

The processor 120 and/or the navigation unit 125 may be configured to communicate with a wireless communication device 170 through a wireless connection (e.g., a cellular data network) via a communication resource (e.g., a radio frequency (RF) resource) 130 to receive assistance data from the server and to provide UAV position information and/or other information to the server. The communication resource (s) 130 may include a radio configured to receive communication signals, navigation signals, signals from aviation navigation facilities, etc., and provide such signals to the processor 120 and/or the navigation unit 125 to assist in UAV navigation tasks.

The processor 120 may use a radio (e.g., 130) to conduct wireless communications with one or more wireless communication device 170 such as smartphone, tablet, or other device with which the UAV 100 may be in communication. A bi-directional wireless communication link 132 may be established between transmit/receive antenna 131 of the communication resource(s) 130 and transmit/receive antenna 171 of the wireless communication device 170. For example, the wireless communication device 170 may be a portable or wearable device of a user that the UAV is configured to track. In some embodiments, the wireless communication device 170 and UAV 100 may communicate through an intermediate communication link such as one or more network nodes or other communication devices. For example, the wireless communication device 170 may be connected to the UAV 100 through a cellular network base station or cell tower. The wireless communication device 170 may communicate with the UAV 100 through local access node or through a data connection established in a cellular network.

In some embodiments, the communication resource(s) 130 may be configured to switch between a cellular connection and a Wi-Fi connection depending on the position and altitude of the UAV 100. For example, while in flight at an altitude designated for UAV traffic, the communication resource(s) 130 may communicate with a cellular infrastructure in order to maintain communications with the wireless communication 170. An example of a flight altitude for the UAV 100 may be at around 400 feet or less, such as may be designated by a government authority (e.g., FAA) for UAV flight traffic. At this altitude, it may be difficult to establish communication with some of the wireless communication devices 170 using short-range radio communication links (e.g., Wi-Fi). Therefore, communications with the wireless communication device 170 may be established using cellular telephone networks while the UAV 100 is at flight altitude. Communication with the wireless communication device 170 may transition to a short-range communication link (e.g., Wi-Fi or Bluetooth) when the UAV 100 moves closer to the wireless communication device 170.

While the various components of the control unit 110 are illustrated in FIG. 1 as separate components, some or all of the components (e.g., the processor 120, the motor control unit 123, the communication resource(s) 130, and other units) may be integrated together in a single device or unit, such as a system-on-chip.

While conventional UAVs may be controlled to navigate according to user commands and/or predetermined navigation paths, some UAVs are additionally or alternatively configured to perform functions that require automatically tracking a particular target. In conventional tracking applications, target information may be used by the UAV to cause the imaging device to track the target so as to maintain predetermined position and/or size of the target within one or more images captured by the imaging device.

Some UAV systems allow a single user to control both the navigation of a UAV and tracking of a target. For example, a user can employ a user interface on a control device to specify the target to the UAV, which then tracks the target. Such tracking may be performed, for example, using an imaging device onboard the UAV. For example, the attitude, position, velocity, zoom, and other aspects of the UAV and/or the imaging device can be automatically adjusted to ensure that the user maintains a designated position and/or size within the images captured by the imaging device.

If the target is associated with a wireless communication device that is configured with one or more GPS receiver, the tracking may be performed based on location information received from the device. The user may also change or adjust the target to track in real time using the control terminal. In particular, current UAVs may be configured to also support one or more tracking modes that enable the user and the target to be one in the same (e.g., a user tracking mode). Various user tracking modes may include, for example, an autonomous user tracking mode (also called "Follow-me" mode) that automatically tracks the target user, and a semi-autonomous user tracking mode that can receive or incorporate user input to override and/or supplement the automatic tracking. As with other tracking modes, the user tracking modes are typically controlled through the user's position within images captured by the UAV, and/or using location information received from a device of the user configured with a GPS receiver.

By implementing a user tracking mode, the user is able to focus on other activities while being followed by the UAV in real time. In existing Follow-me modes, the control device may provide information about its own location or movements to the UAV to help the UAV tracking. The Follow-me mode may be applicable for security applications. For example, the UAVs may be instructed to follow a convoy where the control device is on-board a convoy, or walking around with in a variety of settings, including crowds.

However, the existing techniques employed in user tracking modes have limitations that can reduce performance of the UAV during automatic tracking. For example, when the control device provides GPS information about its own location, such information may be inaccurate or unavailable to a user who is in certain locations (e.g., indoors, etc.). GPS also experiences drift, and GPS receivers on control devices typically have a low update rate (e.g., 1 Hz), causing the UAV to move in a delayed manner relative to the control device. Additionally, when employing line-of-sight tracking using an imaging device (e.g., camera), the UAV may lose track of the user, particularly when the UAV is a long distance from the user.

Various embodiments improve automatic user tracking modes by implementing enhanced estimated positions of the target user. Specifically, various embodiments may accurately and efficiently generate estimated position information using existing features on a wireless communication device that is the target/control device for the UAV. Specifically, the control device in various embodiments may be any of a variety of wireless communication devices worn by, carried by, or associated with the user, such as a smartphone, tablet, wearable computing device, etc., and may be configured with a variety of peripheral components, including sensors. In some embodiments, one or multiple of these sensors and/or other components may be leveraged by the control device to calculate estimated position information or enhance the existing calculation of estimated position information. For example, the control device may be configured, in addition to one or more GPS receiver, with at least one camera and various inertial and other sensors (e.g., accelerometer, gyroscope, magnetometer, etc.). The control device may utilize data collected from these features for calculating estimated position information for the target user, either alone or in conjunction with GPS data. In various embodiments, the control device may calculate its estimated position by implementing various algorithms (e.g., sensor fusion algorithms) using data obtained by one or more camera, and optionally from sensors and/or a GPS receiver on the control device. In various embodiments, calculating estimated position information for the control device may involve using one or more sensor fusion algorithm to calculate the relative position of the control device in its environment, the control device velocity, the control device orientation, etc.

In various embodiments, the control device may supply the estimated position information to the UAV via a communication link. In some embodiments, estimated position information may be calculated and sent to the UAV at periodic intervals. In particular, the UAV may calculate estimated position information of the UAV, which may be based on data from an on-board camera, and optionally at least one sensor and/or GPS receiver, as described. When the user tracking mode is initiated, the UAV may perform an initial movement to track the target user based on the received estimated position information and the current UAV position. Such initial movement may establish a particular distance and/or elevation of the UAV relative to the target user. During the user tracking mode, upon receiving estimated position information from the control device, UAV may update/adjust its motion. For example, in some embodiments, the UAV motion may involve identifying changes in the position of the control device and applying analogous changes to the UAV position (e.g., comparing estimated position information to preceding estimated position information). In some embodiments, the UAV motion may involve evaluating the position of the target user and maintaining the distance and/or elevation of the UAV relative to the target user (e.g., by comparing the estimated position information to a current UAV position).

The various embodiments may enable the UAV in an automatic user tracking mode to receive an estimated position of a target user with improved speed and accuracy. In particular, a camera on the control device may have a frame rate of 30-60 Hz, and inertial sensors (e.g., accelerometer, gyroscope, etc.) on the control device may have sampling rates of up to 500 Hz. Compared to estimated position information that is determined, for example, based on GPS data alone (e.g., 1 Hz update rate), the control device may calculate estimated position information using camera data, either alone or with other sensors, with a higher accuracy, as well as enabling faster reaction times by the UAV.

In some embodiments, data from an imaging system and one or more inertial sensor may be used to determine the position of the target user relative to the surroundings. In particular, the control device position may be determined based on processing a sequence of images to derive control device position information. Such approach may be based on techniques for deriving "egomotion" (i.e., three-dimensional motion) of a camera, which is often performed as part of "structure from motion" (SFM) methods. Specifically, SFM methods involve correlating a series of images taken from a moving camera, which are processed to simultaneously derive both a three dimensional model of the viewed scene and the egomotion of the camera.

In some embodiments, a hybrid approach employing both image processing and inertial sensor measurements may be used, either providing drift cancellation to the inertial sensors based on the image processing or providing estimated motion parameters to the image processing system to improve accuracy of calculations.

Figure 2:
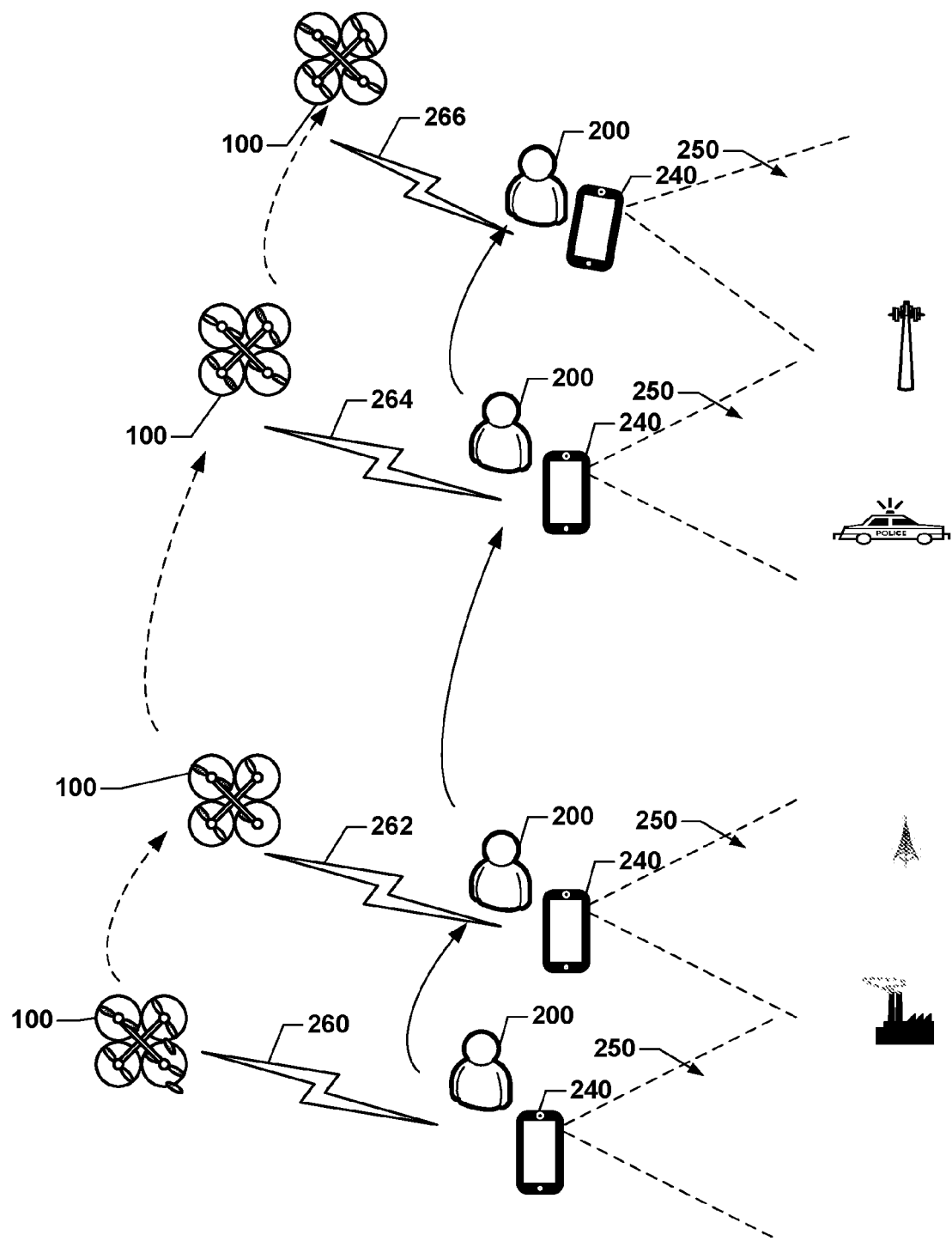
FIG. 2 is a diagram illustrating a UAV flying at a given standoff location relative to a user based on location and movement information communicated by a user's wireless communication device that images its surroundings.

FIG. 2 illustrates the UAV 100 automatically tracking and following a user 200 based on information communicated by control device, such as a wireless communication device 240 carried by the user. In the example illustrated in FIG. 2, the UAV 100 is being controlled to fly a particular distance away and above the user 200 as the user 200 moves (e.g., walking, running, skiing, biking, etc.). Periodically, the user's wireless communication device 240 communicates the user's location to the UAV 100 via wireless communications 260-266. Some of the user location updates communicated to the UAV 100 may be based on or include GPS data obtained by a GPS receiver within the wireless communication device 240. In addition, the user location updates may further include information regarding motions and changes of direction of the user 200 that are determined by the wireless communication device 240 based on imaging objects in the field of view 250 of a camera. For example, the user 200 may be wearing the wireless communication device 240 on a belt so that a camera is able to image (e.g., video) the surroundings of user within the camera's field of view 250.

As the user 200 moves, objects in the background within the field of view 250 shift positions. By determining the change in location within the field of view 250 of background objects from one image to the next divided by the time between each image (e.g., every thirtieth of a second for a 30 frames-per-second video), a processor within the wireless communication device 240 is able to calculate movements of the user 200. If the user 200 is moving in a straight line, the positional shifts of background objects within the field of view 250 from frame to frame the used to calculate the instantaneous velocity of user, particularly if a distance to the background objects is known. If the user is turning, background objects within the field of view 250 will appear to move quickly, depending upon the rate of turning or spending.

Because video frames are obtained approximately every $30^{th}$ of a second, the information obtained by tracking changes in location of objects within the field of view 250 from one frame to the next can track movements of the user faster than may be possible based on GPS alone. Also, tracking changes in location of objects within the field of view 250 from one frame to the next can detect changes in direction of the user 200, and thus may enable a processor (e.g., within the wireless communication device 240 and/or the UAV 100) to predict the future direction of the user 200 faster that can be achieved using GPS and/or accelerometer data. Thus, the various and embodiments may enable a more responsive tracking of the user 200 by the UAV 100 operating in the tracking mode.

Periodically, such as every few frames that are captured and analyzed, the wireless communication device 240 may transmit updated user position information via wireless transmissions 260-266 to the UAV 100. For example, the wireless communication device 240 may transmit GPS coordinates of the user 200 to the UAV 100 at a first periodic rate, such as every 10 seconds (e.g., transmissions 260 and 266), while more frequently transmitting user movement and direction updates based upon processing of background objects within images (e.g., transmissions 262 and 264).

Figure 3:
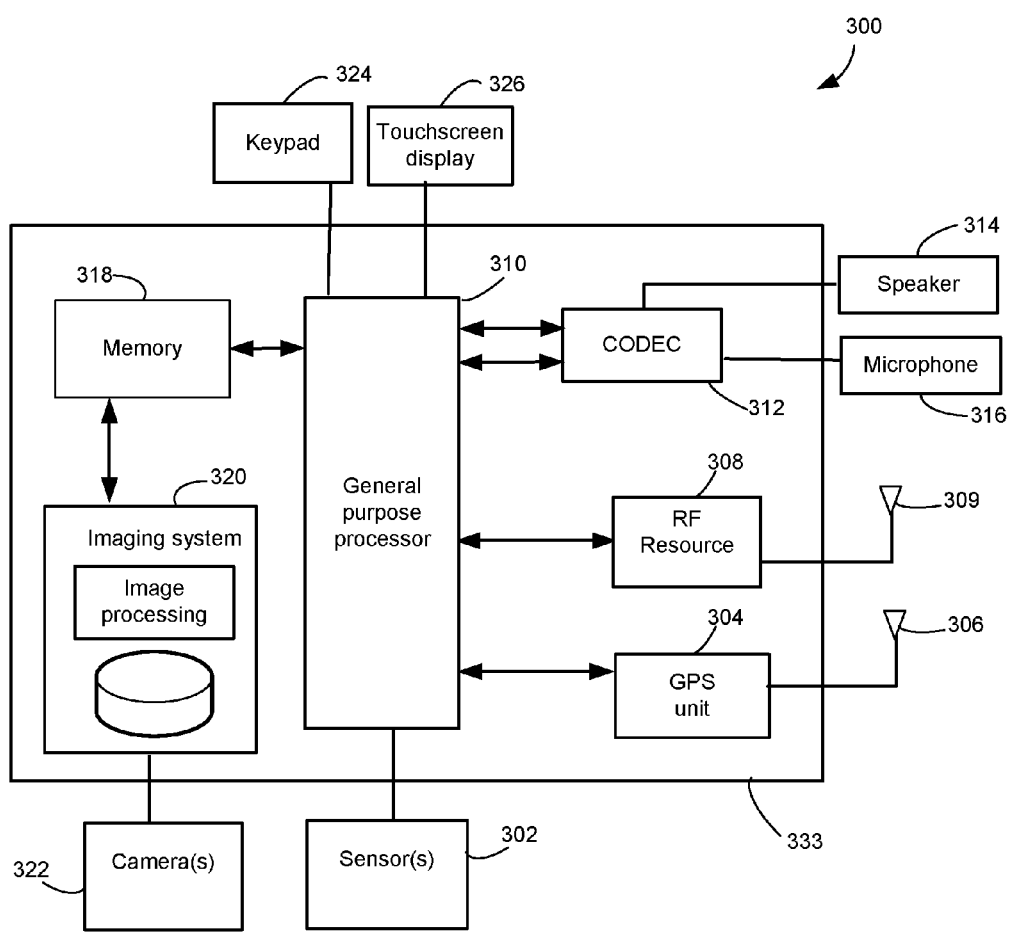
FIG. 3 is a block diagram illustrating a wireless communication device configured to control a UAV according to various embodiments.

FIG. 3 is a functional block diagram of an example wireless communication device 300 that is suitable for controlling a UAV during an automatic user tracking mode in the various embodiments. According to various embodiments, the wireless device 300 may be the control device 240 described with reference to FIG. 2.

With reference to FIGS. 1-3, the wireless communication device 300 may be, for example, a cellular telephone, a personal digital assistant (PDA), a smartphone, a tablet, a wristband, an ankle band, a ring, a watch, a pendant, a belt, or any other type of portable or wearable device. In various embodiments, while in an automatic user tracking mode, the wireless communication device 300 may serve both functions of controlling a UAV (e.g., 100) and providing estimated positions of the target user to the UAV.

The wireless communication device 300 may include at least one sensor 302, such as one or more inertial sensor. For example, inertial sensors may include accelerometers (e.g., three-axis accelerometer), magnetometers (e.g., a 3-axis magnetometer), and/or gyroscopes (e.g., a three-axis gyroscope). The sensor(s) 302 may also include a barometer, which may be used to measure ambient pressure, and therefore to approximate the elevation of the target user. The wireless communication device 300 may also include a GPS unit 304 coupled to at least one antenna 306 tuned to the GPS signaling channel. The GPS unit 304 may generate location signals corresponding to a location of the wireless communication device 300 in response to GPS signals received thereby (i.e., when GPS signals are available).

The wireless communication device 300 may include an RF resource 308 that is coupled to at least one antenna 309 and configured to communicate user position information to UAVs as described above. In various embodiments, the RF rousers 308 and GPS unit 304 may be coupled to a general-purpose processor 310. The RF resource 308 may include receive circuitry for demodulating and decoding RF signals in order to recover operational parameter signals that are provided to the general-purpose processor 310. The RF resource 308 may include transmit circuitry for generating RF signals in response to operational control signals for transmission across the wireless link to the UAV. In various embodiments, the RF resource 308 may implement separate transmit and receive functionalities, or may include a transceiver that combines transmitter and receiver functions.

In various embodiments, the RF resource 308 may wirelessly communicate with a UAV via one or more wireless communication protocols, such as Wi-Fi Bluetooth, or other long-range or short-range RF communication. In some embodiments, the wireless communication device 300 may send estimated position calculations based on sensor data to the UAV. In some embodiments, the wireless communication device 300 may additionally or alternatively transmit the raw data from the various sensors and/or GPS unit to the UAV.

In various embodiments, the wireless communication device 300 may include a general-purpose processor 310, which may be a processing unit, application specific integrated circuit (ASIC), a field programmable gate array (FPGA), or other electronic circuitry for performing computations. The general-purpose processor 310 may be coupled to a coder/decoder (CODEC) 312. The CODEC 312 may in turn be coupled to a speaker 314 and a microphone 316. The general-purpose processor may also be coupled to a memory 318 such as non-transitory computer readable storage medium.

The memory 318 may store executable instructions to configure the general-purpose processor 310 to implement the processes disclosed in this disclosure. For example, the general-purpose processor 310 may process the sensor readings of the sensors 302 and perform one or more sensor fusion algorithm to calculate estimated position information.

In various embodiments, the wireless communication device 300 includes an imaging system 320. The imaging system 320 may be coupled to the general-purpose processor 310 and to one or more camera 322. The imaging system 320 may include image processing circuitry and a local storage for image data (e.g., photographs and/or video) captured by the one or more camera 322. To enable rapid analysis of images, the imaging system 320 may make use of buffer memory that holds only a few frames for processing. In some embodiments, the local storage may be a separate storage device, examples of which may include universal serial bus (USB) drives, memory cards, solid-state drives (SSDs), hard disk drives (HDDs), floppy disks, optical disks, magnetic tapes, and the like. For example, the local storage may be a removable storage device such as a memory card, for example, a PC Card, CompactFlash, SmartMedia, Memory Stick, Memory Stick Duo, Memory Stick PRO Duo, Miniature Card, Multimedia Card (MMC), Reduced Size Multimedia Card (RS-MMC), MMCmicro Card (MMCmicro), PS2 card, Secure Digital (SD) card, SxS, Universal Flash Storage (UFS), miniSD, microSD, xD-Picture Card, Intelligent Stick (iStick), etc.

In some embodiments, the local storage may be a partition or part of the memory device 318. The image processing circuitry may be implemented by the general-purpose processor 310, or may be implemented in a separate processing unit. The camera(s) 322 may include sub-components other than image capturing devices, including auto-focusing circuitry, ISO adjustment circuitry, and shutter speed adjustment circuitry, etc.

The imaging system 320 may perform various tasks including image filtering, image calling, video frame sampling, and other image processing, audio processing, and/or video processing techniques. In conjunction with the camera (s) 322, the imaging system 320 may be configured to capture pictures, videos, or any other image data with any suitable parameters such as width, height, aspect ratio, megapixel count, resolution or quality, etc. For example, the imaging device may be configured to capture high-definition or ultra-high-definition videos (e.g., 720p, 1080i, 1080p, 1440p, 2000p, 2160p, 2540p, 4000p, 4320p, etc.).

Raw image data captured by the camera(s) 322 may be pre-processed to extract specific pieces of information. Examples of pre-processing may include re-sampling to assure the correctness of the image coordinate system, noise reduction, contrast enhancement, scale space representation, etc. In some embodiments, the image processing circuitry may further perform various image processing tasks (i.e., image analysis) on the raw data and/or pre-processed image data from the camera(s) 322. In various embodiments, the image analysis may include any of a number of example processing tasks. For example, the image analysis may include feature extraction at any suitable level of complexity, image segmentation, data verification, image recognition, image registration, image matching, etc. The image analysis may be performed using any of variety of methods that determine movement from visual data, referred to as "visual odometry."

For example, the wireless communication device processor may calculate the motion (e.g., speed of travel) and/or change in direction of the wireless communication device 300 over the time between images by determining the relative change in position of recognized features in the field of view. Such features could be low-level computer vision features detected using any of a number of techniques. For example, in features from accelerated segment test (FAST) corner detection, a circle of 16 pixels is used to classify whether a candidate center point is actually a corner. Specifically, if a set of contiguous pixels (e.g., 9 pixels) in the circle are all brighter or darker than the center pixel intensity by at least a threshold value, the candidate point is classified as a corner. Other corner detection methods that may be used include, for example, Harris corner detection.

In some embodiments, features may be detected within image data using algorithms that are typically employed in object recognition tasks. For example, some embodiments may utilize scale-invariant feature transform (SIFT) and/or speeded up robust features (SURF) algorithms, in which features are compared to a database of features extracted from a set of reference images.

In various embodiments, feature detection within image data may be improved by selecting well-distributed features. For example, an image or frame may be divided into a grid, and a number of features may be extracted from each section. Features identified in spaced apart sections may then be tracked from frame to frame for estimating motion, speed and direction.

In some embodiments feature tracking techniques may be employed, such as multi-resolution (e.g., coarse-to-fine) tracking within image data. Feature tracking between images or frames may be improved in various embodiments by estimating a surface normal in a manner that accounts for appearance transformation between views.

In some embodiments, data created by the imaging system 320 as a result of the image analysis (i.e., processed image data) may be used by the general-purpose processor 310 to calculate estimated position information as described. In some embodiments, the general-purpose processor 310 may combine the processed image data with data collected from other sensor(s) 304 and/or from the GPS unit 306 of the wireless communication device 300 in order to calculate the estimated position information. The set of the processed image data with, optionally, other sensor data and/or GPS data that may be used to calculate the estimated position information may be collectively referred to herein as "tracking data."

In some embodiments, the general purpose processor 310, memory 318, RF resource 308, GPS unit 304, and imaging system 320 may be included in a system-on-chip device 333. The sensor(s) 302, the camera(s) 322, and the antennas 306, 309, as well as various input and output devices may be coupled to components of the system-on-chip device 333, such as interfaces or controllers. Example user input components suitable for use in the wireless communication device 300 may include, but are not limited to, a keypad 324 and a touchscreen display 326. In some embodiments, the touchscreen display 326 may be used to implement a user interface to control and monitor the UAV. In some embodiments, the touchscreen display 326 may implement a graphical user interface (GUI) that presents visual information to a user of the wireless communication device 300. The visual information displayed by the GUI may include a graphical map view depicting a location of the UAV, information about the UAV's estimated position in relation to its environment, a predetermined movement path for the UAV once it exists the user tracking mode, and a display of signals received from the UAV, a visual feed view generated from visual signals received from the UAV, etc.

Figure 4A:
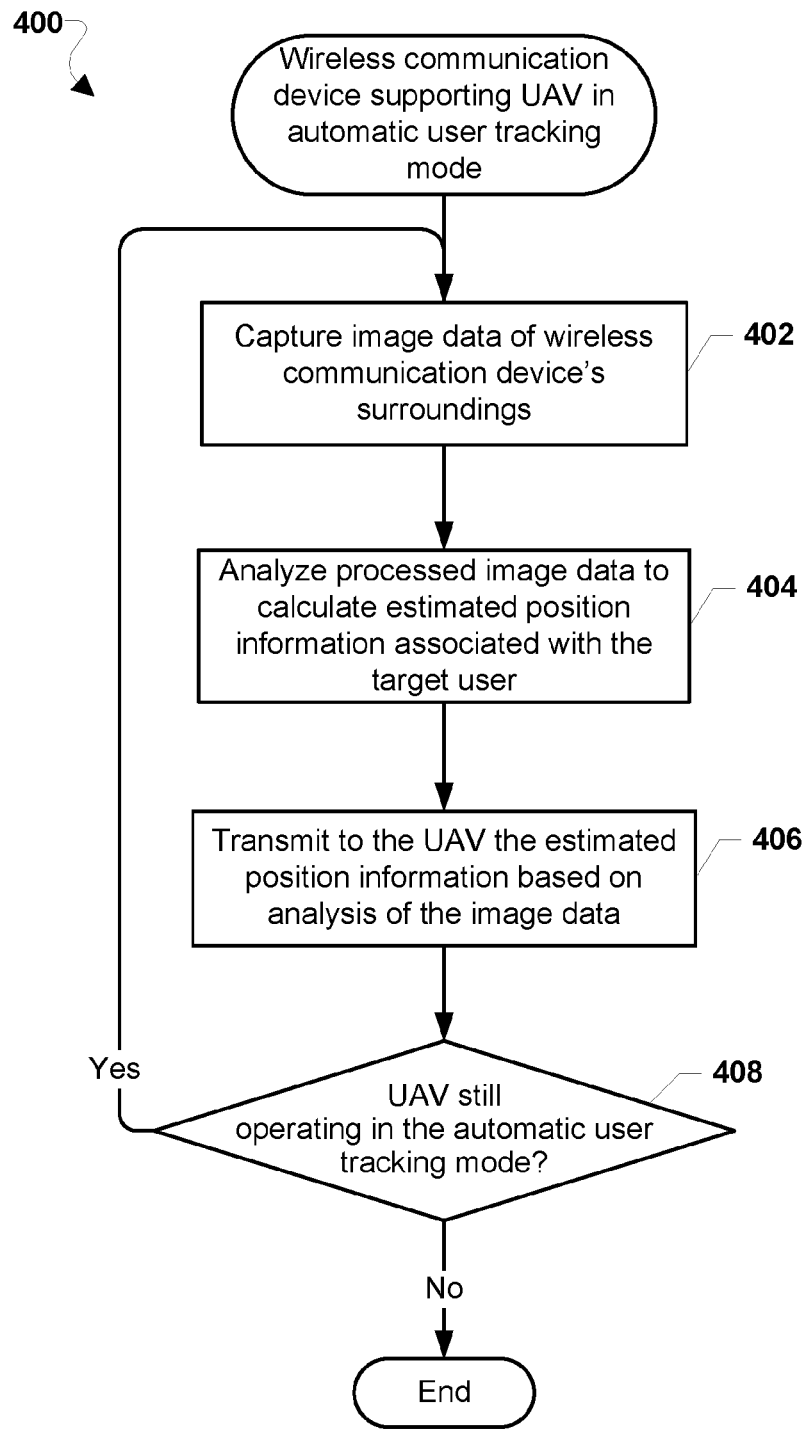
Figure 4B:
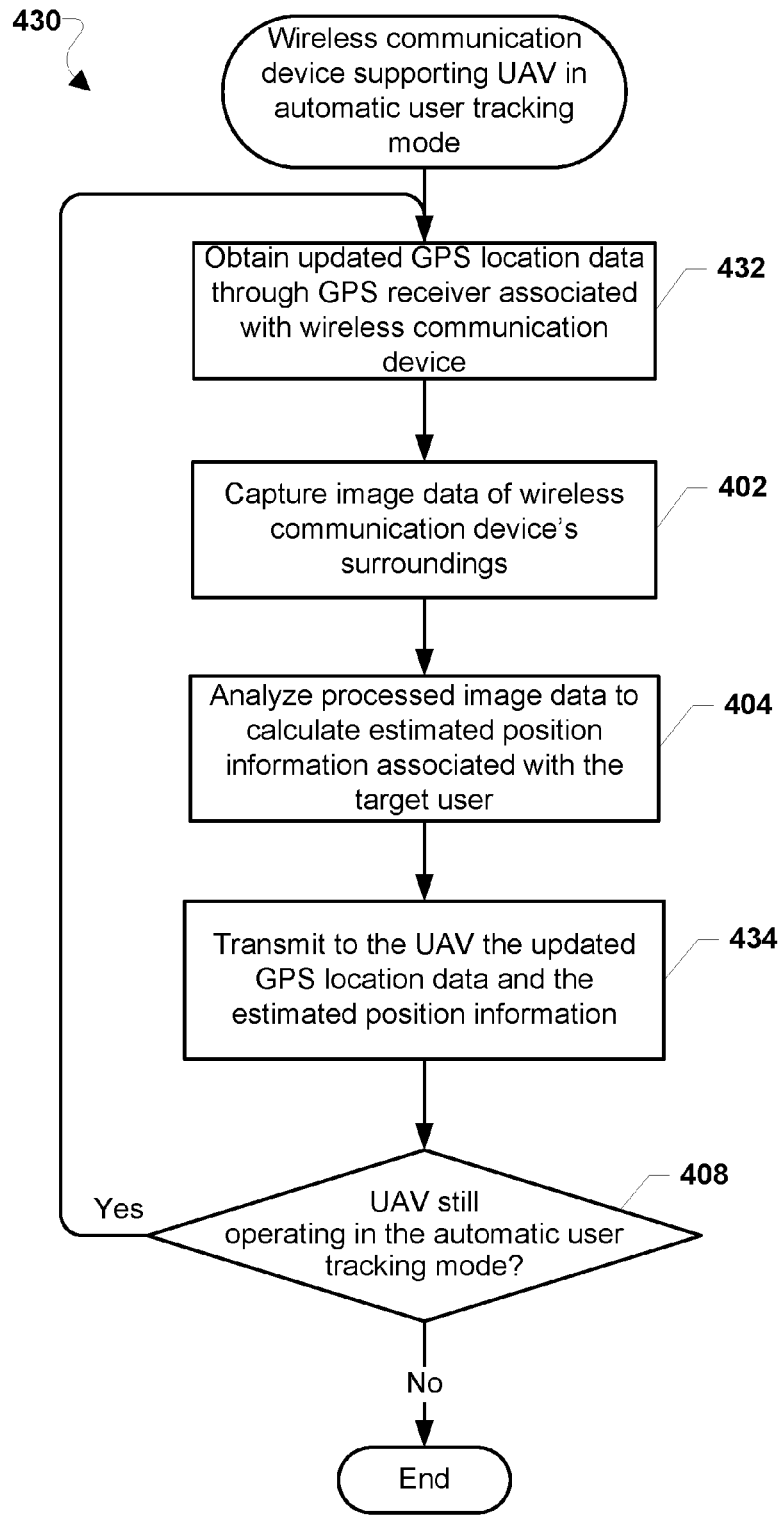

FIGS. 4A-4C illustrate methods 400, 430, 450 for operating a wireless communication device associated with a target user to support a UAV in an automatic user tracking mode, according to various embodiments. In various embodiments, the operations of the methods 400, 430, 450 may be performed by the control device 240 in FIG. 2 and/or the wireless communication device 300 in FIG. 3. In various embodiments, the operations of the methods 400, 430, 450 may be implemented by one or more processors associated with the wireless communication device. Such one or more processors may include, for example, a processor of the wireless communication device, such as the general purpose processor 310 in FIG. 3, or a separate controller (not shown) that may be coupled to the memory 318, to the imaging system 320, and/or the sensor(s) 302 in FIG. 3. The operations of the methods 400, 430, 450 in various embodiments involve calculating on the wireless communication device estimated position information (i.e., an estimated position, change in position information, or combined position information), and providing the position information to the UAV, optionally with GPS location data, for tracking a target user.

With reference to FIGS. 1-4A, the method 400 may be initiated while the wireless communication device is connected to a UAV (e.g., 100) and supporting the UAV in the automatic user tracking mode. In some embodiments, the start of the automatic user tracking mode may be triggered in response to user input requesting activation of such mode, and/or by receiving signals from the UAV regarding its operating mode. In some embodiments, the automatic user tracking mode may be initiated based on the device satisfying various pre-programmed conditions/criteria. That is, in various embodiments, the wireless communication device processor may be configured with sets of conditions and/or criteria for launching a plurality of different tracking modes. In various embodiments, the wireless communication device may use the RF resource 308 to communicate with the UAV via one or more wireless communication protocols. In some embodiments, the wireless communication device may use the connection with the UAV to provide initial target information to the UAV over the communication network. Such information may include the initial position, location, elevation, orientation, size, and/or other information about the wireless communication device and/or the target user. In some embodiments, the initial target information may include an identification code, authentication key, International Mobile Equipment Identity (IMEI)/Electronic Serial Number (ESN) and/or other information that provides details about the target user and/or the wireless communication device.

In block 402, the wireless communication device processor may capture image data of the wireless communication device's surroundings using at least one camera associated with (i.e., on or connected/coupled to) the wireless communication device. In various embodiments, the captured image data may include a sequence of still images and/or a video stream to be analyzed for obtaining tracking data. As described, the image data may be processed by an imaging system (e.g., 320) that is coupled to the at least one camera (e.g., 322) on the wireless communication device.

In block 404, the wireless communication device processor may analyze the processed image data to calculate estimated position information associated with the target user. In some embodiments, calculating estimated position information may involve calculating a change in position information, which may be a change in the user's location, movement and/or direction of travel. For example, the wireless communication device processor may calculate the motion (e.g., speed of travel) and/or change in direction of the wireless communication device over the time between each image by determining the relative change in position of recognized objects in the field of view and dividing by the time between images. The image analysis may be performed using any of variety of visual odometry techniques as described. As described, such calculations may involve identifying a position of the wireless communication device relative to the current environment. For example, using sequential image data captured by one or more camera (e.g. 322) over a period of time, the wireless communication device processor may compute a distance traveled, a change in elevation, and/or a degree of rotation by the device over the time between each captured image and/or video frame by tracking features or objects in the images. Any suitable image recognition or identification techniques may be used to identify the features/objects within the captured image data, including approaches based on CAD-like object models, appearance-based methods (e.g., using edge matching, grayscale matching, gradient matching, histograms of receptive field responses, or large model bases), feature-based methods (e.g., using interpretation trees, hypothesizing and testing, pose consistency, pose clustering, invariance, geometric hashing, Scale-invariant feature transform (SIFT), or Speeded Up Robust Features (SURF)), etc.

In block 406, the wireless communication device may transmit to the UAV the estimated position information determined based on the analysis of the image data for the UAV's use in tracking the target user. In some embodiments, the estimated position information may be a calculated change in position, which may be used by the UAV, for example, to stay in the same relative position with respect to the wireless communication device. In some embodiments, the estimated position information may be a current estimated position of the wireless communication device, which may be used by the UAV to calculate the wireless communication device's change in position.

In determination block 408, the wireless communication device processor may determine whether the UAV is still operating in the automatic user tracking mode. For example, the wireless communication device may receive a user input requesting termination of the automatic user tracking mode, and may send an instruction indicating termination of the automatic user tracking mode of operation by the UAV. Therefore, in some embodiments, the wireless communication device processor may perform the determination of whether the UAV is still operating in the automatic user tracking mode without receiving a subsequent communication from the UAV. In some embodiments, the UAV may exit the automatic user tracking mode based on external conditions and/or pre-programmed parameters. For example, in some embodiments the UAV may have a default setting that ends the automatic user tracking mode after a particular period of time unless otherwise instructed. In some embodiments, the UAV may be configured to terminate the automatic user tracking mode upon detecting a low power state, sustained signal loss, equipment failure, etc. In some embodiments the wireless communication device may receive a notification that the automatic user tracking mode is terminated from the UAV over the established network link. In some embodiments, the wireless communication device may be configured to periodically transmit confirmation requests/pings to the UAV, which may respond with acknowledgment signals confirming the continuation of the automatic user tracking mode.

In response to determining that the UAV is still operating in the automatic user tracking mode (i.e., determination block 408="Yes"), the wireless communication device processor may continue capturing image data of the wireless communication device surroundings in block 402.

In response to determining that the UAV is not still operating in the automatic user tracking mode (i.e., determination block 408="No"), the wireless communication device processor may end the method 400.

In some embodiments, the tracking data may also include data received by a GPS unit (e.g., 304) in addition to the image data. Referring to FIGS. 1-4B, the method 430 may be initiated while the wireless communication device is connected to a UAV (e.g., 100) and supporting the UAV in the automatic user tracking mode. Similar to the method 400, in some embodiments, the start of the automatic user tracking mode may be triggered in response to a user input requesting such mode, by receiving signals from a server or other computing device through a network link, and/or based on the device satisfying pre-programmed conditions/criteria. Also similar to method 400, in some embodiments the wireless communication device may use the connection with the UAV to provide the initial target information to the UAV over the communication network.

In block 432, the wireless communication device processor may obtain updated GPS location data from a GPS receiver associated with (i.e., on or coupled/connected to) the wireless communication device.

In block 402 (which may occur before, after, or simultaneously with block 432), the wireless communication device processor may capture image data of the wireless communication device's surroundings using at least one camera associated with (i.e., on or connected/coupled to) the wireless communication device. In various embodiments, the captured image data may include a sequence of still images and/or a video stream of images to be analyzed to obtain tracking data. As described, the image data may be processed by an imaging system (e.g., 320) that is coupled to the at least one camera (e.g., 322) on the wireless communication device.

In block 404, the wireless communication device processor may analyze the processed image data to calculate estimated position information associated with the target user as described. For example, calculating estimated position information may involve calculating a change in position information (e.g., based on calculating motion and/or change in direction) associated with wireless communication device.

In block 434, the wireless communication device may transmit to the UAV the updated GPS location data and the estimated position information based on the analyzed image data for the UAV's use in tracking the target user.

In determination block 408, the wireless communication device processor may determine whether the UAV is still operating in the automatic user tracking mode. As described, in some embodiments the wireless communication device may receive a notification that the automatic user tracking mode is terminated from the UAV over the established network link. In some embodiments, the wireless communication device may be configured to periodically transmit confirmation requests/pings to the UAV, which may respond with acknowledgment signals confirming the continuation of the automatic user tracking mode.

In response to determining that the UAV is still operating in the automatic user tracking mode (i.e., determination block 408="Yes"), the wireless communication device processor may continue obtaining updated GPS data through a GPS receiver associated with (i.e., on or connected/coupled to) the wireless communication device in block 432 and obtaining images in block 402. In some embodiments, the wireless communication device processor may be configured to wait predetermined time duration before obtaining updated GPS data in block 432, although the camera system may continue obtaining and processing images in blocks 402 and 404. Such predetermined time duration, or the absence thereof, may be based on the types and capabilities of the various sensors that provide tracking data on the wireless communication device.

In response to determining that the UAV is not still operating in the automatic user tracking mode (i.e., determination block 408="No"), the wireless communication device processor may end the method 430.

In some embodiments, the tracking data may also include data captured by one or more sensor (e.g., 302), such as inertial sensor(s), a barometer, etc., in addition to the data received by the GPS unit (e.g., 304) and the image data. Referring to FIGS. 1-4C, the method 450 may be initiated while the wireless communication device is connected to a UAV (e.g., 100) and supporting the UAV in the automatic user tracking mode. Similar to methods 400, 430, in some embodiments, the start of the automatic user tracking mode may be triggered in response to user input requesting such mode, by receiving signals from a server or other computing device through a network link, and/or based on the device satisfying pre-programmed conditions/criteria. Also similar to methods 400, 430, in some embodiments, the wireless communication device may use the connection with the UAV to provide the initial target information to the UAV over the communication network.

In block 432, the wireless communication device processor may obtain updated GPS location data through a GPS receiver on the wireless communication device as described. In block 402, the wireless communication device processor may capture image data of the wireless communication device's surroundings using at least one camera associated with the wireless communication device as described. In block 404, the wireless communication device processor may analyze the processed image data to calculate estimated position information associated with the target user as described. For example, in some embodiments the wireless communication device processor may calculate change in position information (e.g., based on calculating motion and/or change in direction) associated with the wireless communication device as described. In some embodiments, the wireless communication device processor may calculate a current estimated position of the wireless communication device as described.

In block 452 (which may be performed before, after, or simultaneously with block 432 and/or block 402), the wireless communication device processor may obtain output data from one or more accelerometers and/or a gyroscope associated with (i.e., on or connected/coupled to) the wireless communication device. Such sensors provide information based on direct movements of the wireless communication device.

In block 454, the wireless communication device processor may generate combined position information based on the accelerometer and/or gyroscope data in combination with or consideration of the estimated position information (e.g., calculated change in position information and/or current estimated position) obtained from processing images in block 404. Information from accelerometers and/or gyroscopes may be helpful in analyzing the movement of background objects in obtained images because both sources of information are directly measuring movements of the wireless communication device. For example, analyzing images alone may provide confusing results when the user is turning quickly in circles (e.g., spinning), but such motion may be detected and thus understood based on data from a gyroscope. Continuing this example, if data from a gyroscope indicates that the user is spinning, the rapid movement of objects in the background of images may be discounted or disregarded when providing position updates to the UAV because the user's position is not changing as rapidly as the images might suggest. As another example, accelerometer data may be used to confirm movement calculations obtained from analyzing images, and vice versa.

Generating such combined position information may involve applying one or more sensor fusion algorithms to the data that merges the calculated change in position information and the inertial sensor data (e.g., accelerometer output, gyroscope output, etc.) in order to identify a position of the wireless communication device relative to its current environment in a more comprehensive manner than the using the image data alone. For example, using information calculated based on a set of sequential images of the surroundings captured by one or more camera (e.g. 322) over a period of time, as well as output data from an accelerometer and/or gyroscope, a sensor fusion algorithm may provide an enhanced estimation of the distance traveled, the change in elevation, and/or the degree of rotation by the device over that time span. Further, the fusion algorithm may incorporate into the computation various measurements of speed, orientation, atmospheric pressure, coordinate-based location, etc. collected on the wireless communication device depending on the configured sensors. In particular, fusion algorithms may involve visual-inertial odometry, which uses data from one or more inertial sensor (e.g., accelerometers, gyroscopes, etc.) and data from, and/or calculation results based on, the processed image data (e.g., the calculated estimated position information in block 404).

In block 456, the wireless communication device may transmit to the UAV the updated GPS location data and the combined position information for the UAV's use in tracking the target user. In some embodiments, the automatic user tracking mode may be a semi-autonomous mode, and the wireless communication device may be configured to send user-directed commands to the UAV along with position information. For example, the wireless communication device may be configured to instruct the UAV to change speed and/or direction by implementing a particular velocity and/or yaw rate. In this manner, the user of the wireless communication device (i.e., target user) may be afforded some control over the UAV through flight commands, even while the wireless communication device being automatically tracked.

In some embodiments, the UAV may be provided with additional capabilities that enable sensing obstacles (e.g., a stereo pair of cameras). In such embodiments, when the automatic user tracking mode is semi-autonomous, the change in position data, the combined position information, and/or the GPS data from the wireless communication device may be used by the UAV to correct and/or override commands for UAV flight (e.g., an instructed velocity and/or yaw rate) received directly from the user of the wireless communication device (i.e., target user). For example, using the change in position UAV may avoid flying into an obstacle (e.g., tree, building, etc.) even if such maneuvers conflict with instructions previously or simultaneously received from the target user.

In determination block 408, the wireless communication device processor may determine whether the UAV is still operating in the automatic user tracking mode. As described in method 400, in some embodiments the wireless communication device may receive a notification that the automatic user tracking mode is terminated from the UAV over the established network link. In some embodiments, the wireless communication device may be configured to periodically transmit confirmation requests/pings to the UAV, which may respond with acknowledgment signals confirming the continuation of the automatic user tracking mode.

In response to determining that the UAV is still operating in the automatic user tracking mode (i.e., determination block 408="Yes"), the wireless communication device processor may again obtain updated GPS location data from the GPS receiver on the wireless communication device in block 432 and repeat the operations of the method 450.

In response to determining that the UAV is no longer operating in the automatic user tracking mode (i.e., determination block 408="No"), the wireless communication device processor may end the method 450.

Figure 5:
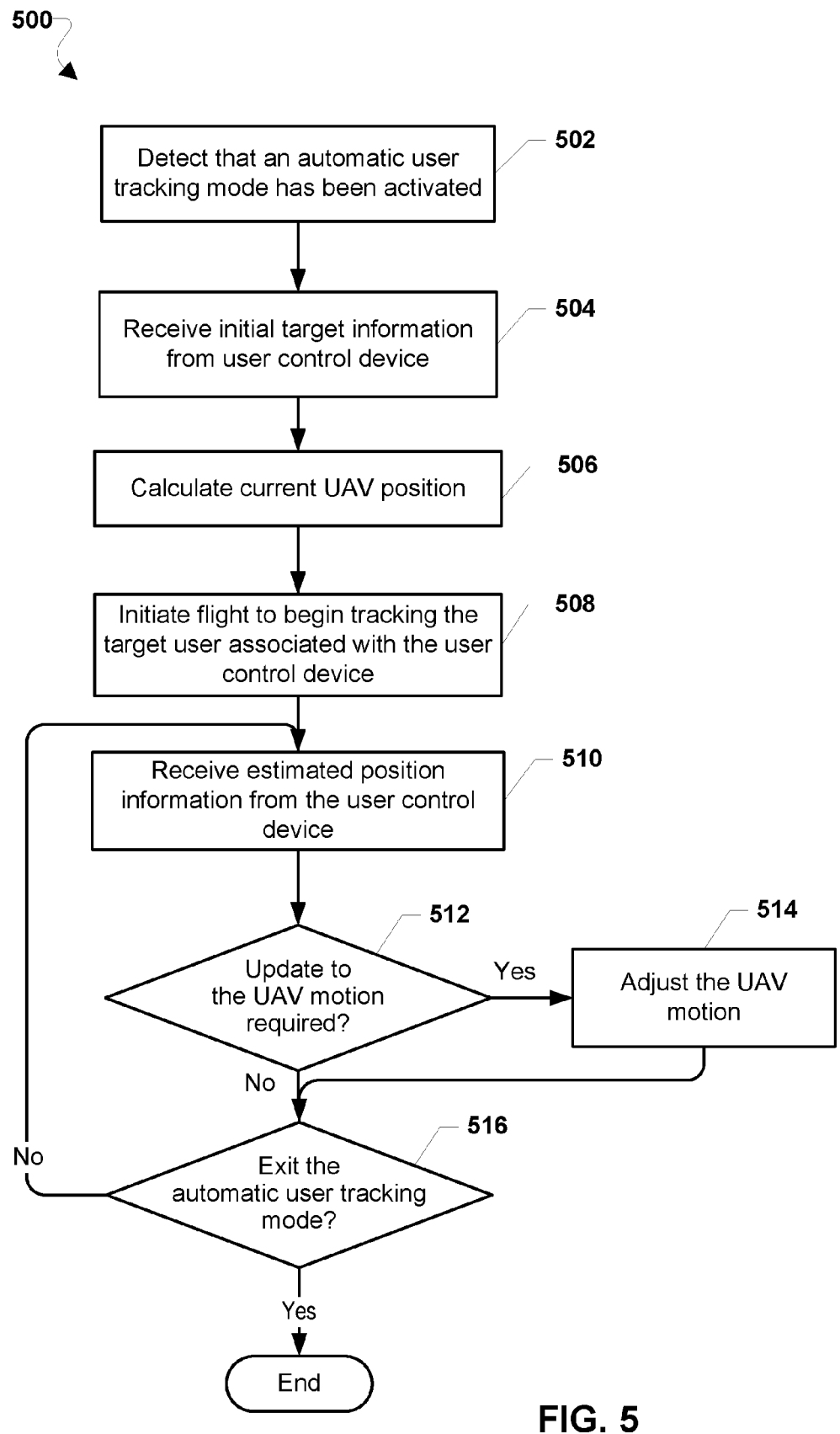
FIG. 5 is a process flow diagram illustrating a method for operating an automatic user tracking mode on a UAV according to various embodiments.

FIG. 5 illustrates a method 500 for implementing an automatic user tracking mode on a UAV to track a wireless communication device associated with a target user, according to various embodiments. With reference to FIGS. 1-5, the UAV (e.g., 100) may be configured to communicate with at least one control device (e.g., 240), which may be a wireless communication device (e.g., 300). In various embodiments, the operations of the method 500 may be implemented by one or more processors (e.g., 120) of the UAV, such as a general purpose processor or a separate controller (not shown) that may be coupled to the memory (e.g., 121), flight and/or position controllers, and other components and systems.

In block 502, the UAV processor may detect that the automatic user tracking mode has been activated on the UAV. In some embodiments, the UAV may receive from the control device instructions to initiate the automatic user tracking mode.

In block 504, the UAV processor may receive initial target information from the control device. As described, in various embodiments, the initial target information may be any information that may be used to identify the control device, and to identify the initial location of the control device and/or target user.

In block 506, the UAV processor may calculate a current UAV position. In various embodiments, similar to the estimated position information calculated in method 400 (e.g., 408), the current UAV position may be a position of the UAV relative to its surroundings. In some embodiments, the current UAV position may be the UAV's elevation and/or location. In various embodiments, the current UAV position may be calculated using data obtained from one or more on-board sensors of the UAV. For example, the current UAV position may be calculated by receiving, for example, image data captured by a camera, a barometer reading, a GPS z-axis reading, an inertial sensor reading, or any combination thereof. In various embodiments, the inertial sensors on the UAV may include one or more of 3-axis accelerometers, 3-axis magnetometers, and 3-axis gyroscopes. In some embodiments, the current UAV position may be determined based on visual odometry solutions using image data captured by a camera, as described with respect to the control device.

In various embodiments, the UAV may be configured with a separate controller or logic that tracks orientation of the UAV, stabilizing the UAV at a desired tilt angle. In various embodiments, the UAV may be configured with a separate controller or logic to keep a desired setpoint for the UAV position.

In block 508, the UAV may begin controlling flight by tracking the target user associated with the control device. The flight controls may be based on the calculated current UAV position and the initial target information. This process may involve flying to a position at a preset elevation and/or ground distance ("selected offset") from the control device.

In block 510, the UAV processor may receive estimated position information from the control device.

In determination block 512, the UAV processor may determine whether an update to the UAV motion is required. In various embodiments, updating the motion of the UAV device may involve, for example, adjusting the UAV velocity, elevation, orientation, etc. of the UAV. In some embodiments, determining whether an update to the UAV motion is required may be based on comparing received estimated position information from the control device to previous estimated position information, and detecting whether there is any difference. In some embodiments, determining whether an update to the UAV motion is required may involve comparing the estimated position information to the current UAV position, and detecting whether a preset elevation and/or ground distance (i.e., a selected offset) from the control device is maintained. Therefore, some embodiments may require re-calculating the current UAV position upon receiving the estimated position information. For example, if the target user has moved forward five meters, the desired setpoint for the UAV position may be adjusted five meters.

In response to determining that an update to the UAV motion is required (i.e., determination block 512="Yes"), the UAV processor may adjust the UAV motion in block 514. For example, if a difference was detected between the estimated position information and preceding estimated position information, the adjustment in the UAV motion may be a corresponding change in position of the UAV. In another example, if a selected offset from the control device was not maintained, the UAV motion may be adjusted to return to that preset elevation and/or distance. In various embodiments, the UAV processor may provide instructions that cause the thrust power of at least one propeller driver to accomplish the required motion adjustment.

Following block 514 or in response to determining that an update to the UAV motion is not required (i.e., determination block 512="No"), the UAV processor may determine whether to exit the user tracking mode in determination block 516. As described, the automatic user tracking mode may be stopped, for example, as a result of user input to the control device, or based on external conditions and/or preset parameters that ensure the quality of the UAV performance.

In response to determining not to exit the automatic user tracking mode (i.e., determination block 516="No"), the UAV processor may return to block 510 to receive estimated position information from the control device. In response to determining to exit the automatic user tracking mode (i.e., determination block 516="Yes"), the UAV processor may end the method 500 and transition to a different type of flight control.

Figure 6:
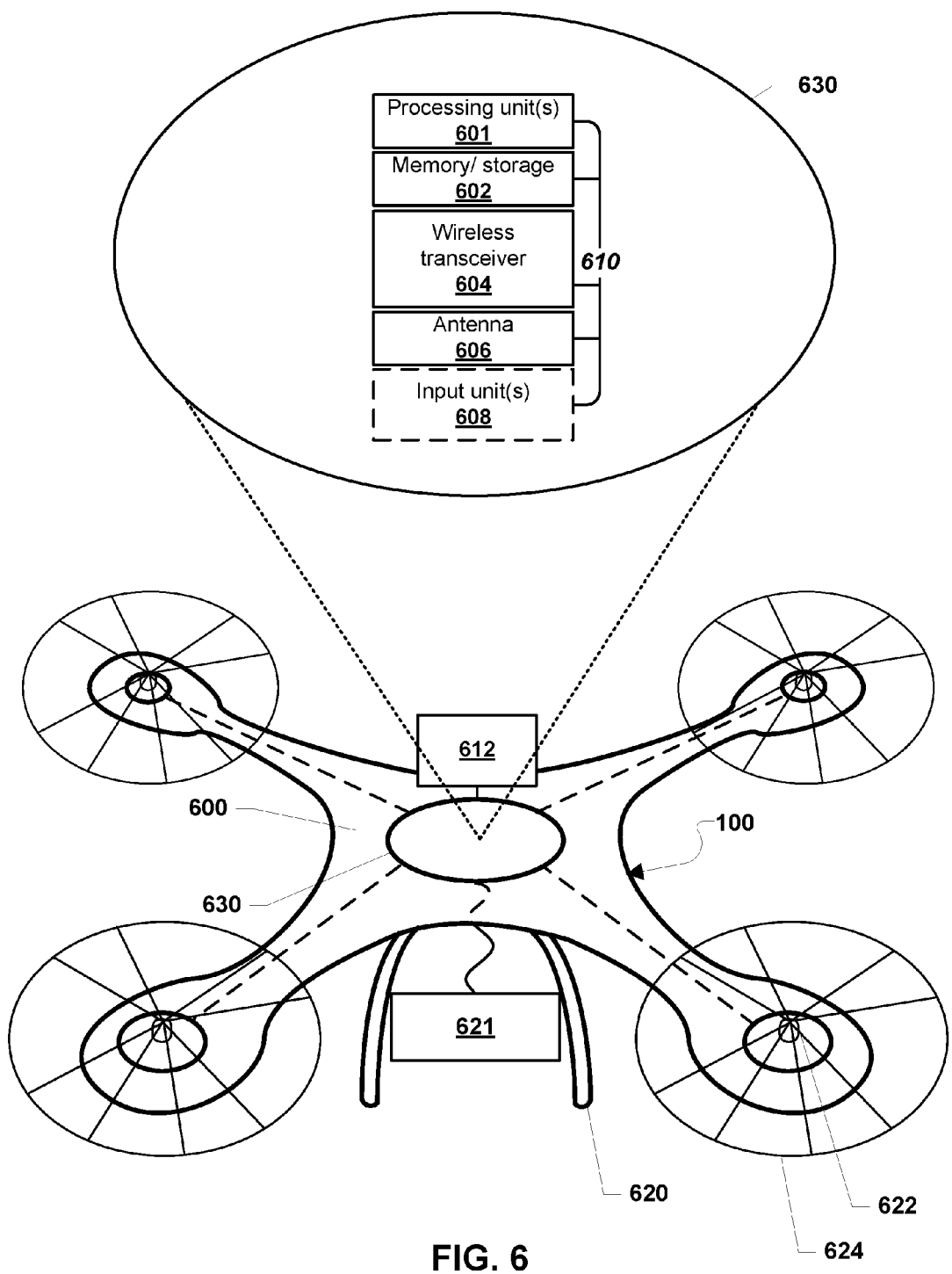
FIG. 6 is a component block diagram of a UAV suitable for use with the various embodiments.

The various embodiments may be implemented within a variety of UAVs, an example of which in the form of a four-rotor UAV is illustrated in FIG. 6 that is suitable for use with the various embodiments including the embodiments described with reference to FIG. 5. With reference to FIGS. 1-6, the UAV 100 may include a body 600 (i.e., fuselage, frame, etc.) that may be made out of any combination of plastic, metal, or other materials suitable for flight. The body 600 may include a processor 630 that is configured to monitor and control the various functionalities, subsystems, and/or other components of the UAV 100. For example, the processor 630 may be configured to monitor and control various functionalities of the UAV 100, such as any combination of modules, software, instructions, circuitry, hardware, etc. related to propulsion, navigation, power management, sensor management, and/or stability management.

The processor 630 may include one or more processing unit(s) 601, such as one or more processors configured to execute processor-executable instructions (e.g., applications, routines, scripts, instruction sets, etc.), a memory and/or storage unit 602 configured to store data (e.g., flight plans, obtained sensor data, received messages, applications, etc.), and a wireless transceiver 604 and antenna 606 for transmitting and receiving wireless signals (e.g., a Wi-Fi® radio and antenna, Bluetooth®, RF, etc.). In some embodiments, the UAV 100 may also include components for communicating via various wide area networks, such as cellular network transceivers or chips and associated antenna (not shown). In some embodiments, the processor 630 of the UAV 100 may further include various input units 608 for receiving data from human operators and/or for collecting data indicating various conditions relevant to the UAV 100. For example, the input units 608 may include camera(s), microphone(s), location information functionalities (e.g., a global positioning system (GPS) receiver for receiving GPS coordinates), flight instruments (e.g., attitude indicator(s), gyroscope(s), accelerometer(s), altimeter(s), compass(es), etc.), keypad(s), etc. The various components of the processor 630 may be connected via a bus 610 or other similar circuitry.

The body 600 may include landing gear 620 of various designs and purposes, such as legs, skis, wheels, pontoons, etc. The body 600 may also include a payload mechanism 621 configured to hold, hook, grasp, envelope, and otherwise carry various payloads, such as boxes. In some embodiments, the payload mechanism 621 may include and/or be coupled to actuators, tracks, rails, ballasts, motors, and other components for adjusting the position and/or orientation of the payloads being carried by the UAV 100. For example, the payload mechanism 621 may include a box moveably attached to a rail such that payloads within the box may be moved back and forth along the rail. The payload mechanism 621 may be coupled to the processor 630 and thus may be configured to receive configuration or adjustment instructions. For example, the payload mechanism 621 may be configured to engage a motor to re-position a payload based on instructions received from the processor 630.

The UAV 100 may be of a helicopter design that utilizes one or more rotors 624 driven by corresponding motors 622 to provide lift-off (or take-off) as well as other aerial movements (e.g., forward progression, ascension, descending, lateral movements, tilting, rotating, etc.). The UAV 100 may utilize various motors 622 and corresponding rotors 624 for lifting off and providing aerial propulsion. For example, the UAV 100 may be a "quad-copter" that is equipped with four motors 622 and corresponding rotors 624. The motors 622 may be coupled to the processor 630 and thus may be configured to receive operating instructions or signals from the processor 630. For example, the motors 622 may be configured to increase rotation speed of their corresponding rotors 624, etc. based on instructions received from the processor 630. In some embodiments, the motors 622 may be independently controlled by the processor 630 such that some rotors 624 may be engaged at different speeds, using different amounts of power, and/or providing different levels of output for moving the UAV 100. For example, motors 622 on one side of the body 600 may be configured to cause their corresponding rotors 624 to spin at a higher rotations per minute (RPM) than rotors 624 on the opposite side of the body 600 in order to balance the UAV 100 burdened with an off-centered payload.

The body 600 may include a power source 612 that may be coupled to and configured to power the various other components of the UAV 100. For example, the power source 612 may be a rechargeable battery for providing power to operate the motors 622, the payload mechanism 621, and/or the units of the processor 630.

The various processors described herein may be any programmable microprocessor, microcomputer or multiple processor chip or chips that can be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

Figure 7:
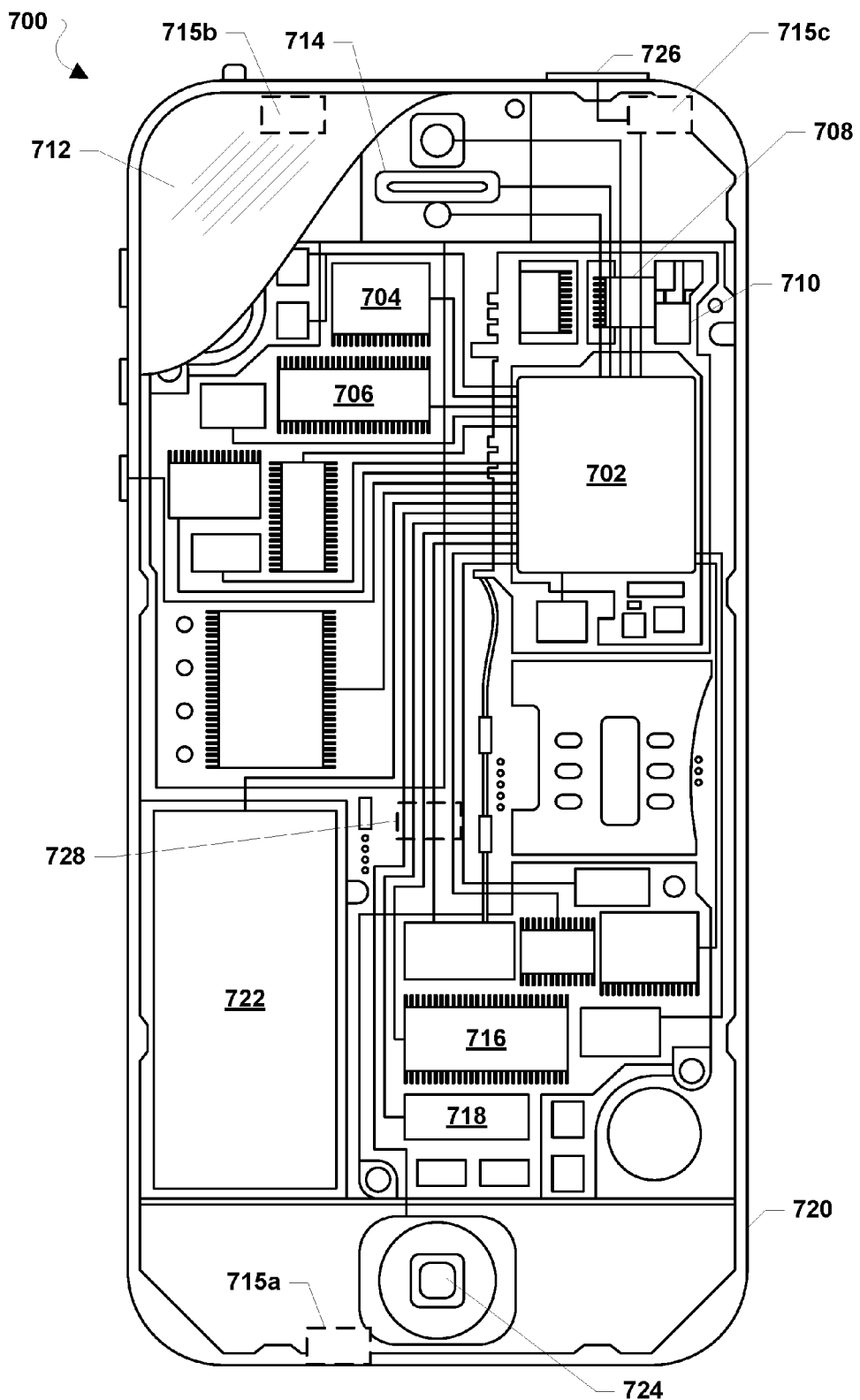
FIG. 7 is a component diagram of an example wireless communication device suitable for use with various embodiments.

In various embodiments, the control device that may control and be tracked by UAV 100 through cellular networks, or other communication links, may be any of a variety of wireless communication devices (e.g., smartphones, tablets, etc.) an example in the form of a smartphone or wireless communication device 700 is illustrated in FIG. 7. With reference to FIGS. 1-7, the wireless communication device 700 may include a processor 702 coupled to the various systems of the wireless communication device 700. For example, the processor 702 may be coupled to a touch screen controller 704, radio communication elements, speakers and microphones, and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. In another embodiment (not shown), the wireless communication device 700 may also be coupled to an external memory, such as an external hard drive.

The touch screen controller 704 and the processor 702 may also be coupled to a touch screen panel 712, such as a resistive-sensing touch screen, capacitive-sensing touch screen, infrared sensing touch screen, etc. Additionally, the display of the wireless communication device 700 need not have touch screen capability. The wireless communication device 700 may have one or more radio signal transceivers 708 (e.g., Peanut, Bluetooth, Bluetooth LE, Zigbee, Wi-Fi, RF radio, etc.) and antennae 710, for sending and receiving communications, coupled to each other and/or to the processor 702. The transceivers 708 and antennae 710 may be used with the above-mentioned circuitry to implement the various wireless transmission protocol stacks and interfaces. The wireless communication device 700 may include a cellular network wireless modem chip 716 that enables communication via a cellular network and is coupled to the processor.

The wireless communication device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown).

In some embodiments, the wireless communication device 700 may include microphones 715a-715c. For example, the wireless communication device may have a conventional microphone 715a for receiving voice or other audio frequency energy from a user during a call. The wireless communication device 700 may further be configured with additional microphones 715b and 715c, which may be configured to receive audio including ultrasound signals. Alternatively, all microphones 715a, 715b, and 715c may be configured to receive ultrasound signals. The microphones 715 may be piezo-electric transducers, or other conventional microphone elements. Because more than one microphone 715 may be used, relative location information may be received in connection with a received ultrasound signal through various triangulation methods. At least two microphones 715 configured to receive ultrasound signals may be used to generate position information for an emitter of ultrasound energy.

The wireless communication device 700 may also include speakers 714 for providing audio outputs. The wireless communication device 700 may also include a housing 720, constructed of a plastic, metal, or a combination of materials, for containing all or some of the components discussed herein. The wireless communication device 700 may include a power source 722 coupled to the processor 702, such as a disposable or rechargeable battery. The rechargeable battery may also be coupled to the peripheral device connection port to receive a charging current from a source external to the wireless communication device 700. The wireless communication device 700 may also include a physical button 724 for receiving user inputs. The wireless communication device 700 may also include a power button 726 for turning the wireless communication device 700 on and off.

In some embodiments, the wireless communication device 700 may further include an accelerometer 728, which senses movement, vibration, and other aspects of the device through the ability to detect multi-directional values of and changes in acceleration. In various embodiments, the accelerometer 728 may be used to determine the x, y, and z positions of the wireless communication device 700. Using the information from the accelerometer, a pointing direction of the wireless communication device 700 may be detected.

The processors 630, 702 may be any programmable microprocessor, microcomputer or multiple processor chip or chips that can be configured by software instructions (applications) to perform a variety of functions, including the functions of various embodiments described above. In some mobile devices, multiple processors may be provided, such as one processor dedicated to wireless communication functions and one processor dedicated to running other applications. Typically, software applications may be stored in the internal memory 602, 706 before they are accessed and loaded into the processors 630, 702. The processors 630, 702 may include internal memory sufficient to store the application software instructions. In many mobile devices the internal memory may be a volatile or nonvolatile memory, such as flash memory, or a mixture of both. For the purposes of this description, a general reference to memory refers to memory accessible by the processors 630, 702 including internal memory or removable memory plugged into the mobile device and memory within the processor processors 630, 702 themselves.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable software, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to some embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method performed by a processor associated with a wireless communication device for enabling an unmanned autonomous vehicle (UAV) to operate in an automatic user tracking mode, the method comprising:
    capturing image data of surroundings of the wireless communication device by at least one camera associated with the wireless communication device while the UAV is operating in the automatic user tracking mode;
    calculating estimated position information for the wireless communication device based on the captured image data; and
    transmitting the estimated position information to the UAV for use in tracking a target user.

2. The method of claim 1, further comprising detecting that the automatic user tracking mode is initiated based on detecting user inputs on the wireless communication device.

3. The method of claim 1, further comprising:
    determining whether the UAV is still operating in the automatic user tracking mode; and
    repeating collecting image data, calculating estimated position information, and transmitting the estimated position information to the UAV in response to determining that the UAV is still operating in the automatic user tracking mode.

4. The method of claim 1,
    wherein calculating estimated position information comprises calculating a change in position of the wireless communication device; and
    wherein calculating the change in position comprises analyzing a sequence of the captured image data over a period of time to calculate a rate of movement of at least one feature in the surroundings.

5. The method of claim 1, further comprising:
    obtaining updated location data received through a Global Positioning System (GPS) receiver associated with the wireless communication device; and
    transmitting the updated location data to the UAV for use in tracking the target user.

6. The method of claim 1, further comprising:
    obtaining inertial sensor output data from at least one of an accelerometer, a gyroscope, and a magnetometer associated with the wireless communication device; and
    generating combined position information for the wireless communication device based on the estimated position information and the inertial sensor output data;
    wherein transmitting the estimated position information to the UAV comprises transmitting the combined position information.

7. The method of claim 1, further comprising transmitting:
    initial target information to the UAV, wherein the initial target information provides to the UAV an initial location of the wireless communication device.

8. The method of claim 7, wherein the initial target information provides to the UAV identity data for at least one of the wireless communication device and the target user.

9. The method of claim 1, wherein the estimated position information transmitted to the UAV is configured to enable the UAV to determine whether an update to UAV motion is required.

10. The method of claim 1, wherein calculating estimated position information comprises calculating a current estimated position of the wireless communication device.

11. A method performed by a processor of an unmanned autonomous vehicle (UAV) for enabling the UAV to automatically follow a user, the method comprising:
    calculating a current position of the UAV;
    receiving estimated position information from a wireless communication device associated with the user, wherein the estimated position information is derived from image data of surroundings of the user captured by at least one camera of the wireless communication device; and
    determining whether an update to UAV motion is required.

12. The method of claim 11, wherein receiving the estimated position information from the wireless communication device comprises receiving a change in position calculated by the wireless communication device.

13. The method of claim 11, wherein receiving the estimated position information from the wireless communication device comprises receiving a current estimated position of the wireless communication device, the method further comprising:
    calculating a change in position of the wireless communication device using the received current estimated position.

14. The method of claim 11, wherein determining whether an update to the UAV motion comprises:
    comparing the estimated position information to previous position information received from the wireless communication device; and
    detecting movement of the wireless communication device based on the comparison.

15. The method of claim 11, wherein determining whether an update to the UAV motion comprises:
    comparing the estimated position information to a current UAV position; and
    determining whether the UAV has maintained a selected offset from the wireless communication device, wherein the selected offset comprises a preset elevation or ground distance.

16. A wireless communication device, comprising:
    a transceiver configured to communicate with an unmanned autonomous vehicle (UAV); and
    a processor coupled to the transceiver and configured to:
        obtain image data of surroundings captured by a camera associated with the wireless communication device while the UAV is operating in an automatic user tracking mode;
        calculate estimated position information for the wireless communication device based on the captured image data; and
        transmit the estimated position information via the transceiver to the UAV for use in tracking a target user.

17. The wireless communication device of claim 16, wherein the processor is further configured to detect that the automatic user tracking mode is initiated based on detecting user inputs on the wireless communication device.

18. The wireless communication device of claim 16, wherein the processor is further configured to:

determine whether the UAV is still operating in the automatic user tracking mode; and repeat collecting image data, calculating the estimated position information, and transmitting the estimated position information to the UAV in response to determining that the UAV is still operating in the automatic user tracking mode.

19. The wireless communication device of claim 16, wherein the processor is further configured to:
calculate the estimated position information by calculating a change in position of the wireless communication device, and
calculate the change in position by analyzing a sequence of the captured image data over a period of time to calculate a rate of movement of at least one feature in the surroundings.

20. The wireless communication device of claim 16, wherein the processor is further configured to:
obtain updated location data received through a Global Positioning System (GPS) receiver associated with the wireless communication device; and
transmit the updated location data to the UAV for use in tracking the target user.

21. The wireless communication device of claim 16, wherein the processor is further configured to:
obtain inertial sensor output data from at least one of an accelerometer, a gyroscope, and a magnetometer associated with the wireless communication device; and
generate combined position information for the wireless communication device based on the estimated position information and the inertial sensor output data,
wherein the processor is further configured to transmit the combined position information as the estimated position information transmitted to the UAV.

22. The wireless communication device of claim 16, wherein the processor is further configured to transmit initial target information to the UAV, wherein the initial target information provides to the UAV an initial location of the wireless communication device.

23. The wireless communication device of claim 22, wherein the initial target information provides to the UAV identity data for at least one of the wireless communication device and the target user.

24. The wireless communication device of claim 16, wherein the estimated position information transmitted to the UAV is configured to enable the UAV to determine whether an update to UAV motion is required.

25. The wireless communication device of claim 16, wherein the processor is further configured to calculate the estimated position information by calculating a current estimated position of the wireless communication device.

26. An unmanned autonomous vehicle (UAV), comprising:
a transceiver; and
a processor coupled to the transceiver and configured to:
calculate a current position of the UAV;
receive estimated position information from a wireless communication device associated with a user, wherein the estimated position information is derived from image data of surroundings of the user captured by at least one camera of the wireless communication device; and
determine whether an update to UAV motion is required.

27. The UAV of claim 26, wherein the processor is further configured to receive a change in position calculated by the wireless communication device as at least part of the estimated position information from the wireless communication device.

28. The UAV of claim 26, wherein the processor is further configured to:
receive a current estimated position of the wireless communication device as at least part of the estimated position information from the wireless communication device comprises receiving; and
calculating a change in position of the wireless communication device using the received current estimated position.

29. The UAV of claim 26, wherein the processor is further configured to determine whether an update to the UAV motion by:
comparing the estimated position information to previous position information received from the wireless communication device; and
detecting movement of the wireless communication device based on the comparison.

30. The UAV of claim 26, wherein the processor is further configured to determine whether an update to the UAV motion by:
comparing the estimated position information to a current UAV position; and
determining whether the UAV has maintained a selected offset from the wireless communication device, wherein the selected offset comprises a preset elevation or ground distance.

* * * * *